APPARATUS AND METHOD FOR SEPARATING SIGNATURES IN A GATHERER

Original Filed June 10, 1970 4 Sheets-Sheet 1

INVENTORS
CARLTON V. HAGEMAN
BY VICTORIANO F. RANA
Kenyon & Kenyon Reilly Carr & Chapin
ATTORNEYS

APPARATUS AND METHOD FOR SEPARATING SIGNATURES IN A GATHERER

Original Filed June 10, 1970 4 Sheets-Sheet 2

INVENTORS
CARLTON V. HAGEMAN
BY VICTORIANO F. RANA
Kenyon & Kenyon Reilly Carr & Chapin
ATTORNEYS

APPARATUS AND METHOD FOR SEPARATING SIGNATURES IN A GATHERER

Original Filed June 10, 1970 4 Sheets-Sheet 3

INVENTORS
CARLTON V. HAGEMAN
VICTORIANO F. RAMA
BY Kenyon & Kenyon Reilly Carr & Chapin
ATTORNEYS

APPARATUS AND METHOD FOR SEPARATING SIGNATURES IN A GATHERER

Original Filed June 10, 1970 4 Sheets-Sheet 4

INVENTORS
CARLTON V. HAGEMAN
BY VICTORIANO F. RANA
Kenyon & Kenyon Reilly Carr & Chapin
ATTORNEYS United States Patent Office Re. 28,048
Reissued June 18, 1974

28,048

APPARATUS AND METHOD FOR SEPARATING SIGNATURES IN A GATHERER

Carlton V. Hageman, and Victoriano F. Rana, Easton, Pa., assignors to Harris-Intertype Corporation, Cleveland, Ohio Original No. 3,650,525, dated Mar. 21, 1972, Ser. No. 45,010, June 10, 1970. Application for reissue Mar. 16, 1973, Ser. No. 342,292

Int. Cl. B65h *3/08, 3/50*

U.S. Cl. 271—101 15 Claims

Matter enclosed in heavy brackets [ ] appears in the original patent but forms no part of this reissue specification; matter printed in italics indicates the additions made by reissue.

ABSTRACT OF THE DISCLOSURE

A signature gathering machine having an improved rotary lifter separator for separating and deflecting the lowermost signature of a stack of signatures in a stack hopper for extraction therefrom while continually supporting the forward edges of the signatures in the stack thereby reducing pressure and friction on the lowermost signature being extracted and reducing the possibility of the next lowermost signature following the signature being extracted. The rotary lifter separator comprises a disk-like rotary separator having a leading edge which rotates into the stack between a detached lowermost signature and the stack and separates and positions the forward edge of the lowermost signature whereupon it is gripped by a rotary drum mechanism and pulled in an extracting direction from the stack. The periphery of the upper surface of the disk-like rotary separator continually supports the forward edges of the signatures in the stack as the separator rotates. Additionally, a stack support means supports the forward edges of a portion of signatures in the stack thereby further reducing the pressure and friction on the lowermost signature. A controlling means cyclically releases the support to the portion of signatures permitting them to settle towards the bottom of the hopper.

BACKGROUND OF THE INVENTION

This invention relates generally to a signature gathering machine for making books, pamphlets, and the like, and more particularly, to a rotary lifter separator for separating successive lowermost signatures from a stack of signatures in a stack hopper and positioning them for extraction therefrom and delivery to a continuously advancing conveyor.

In making of books, pamphlets, and the like, it is common to utilize a signature gathering machine. A signature gathering machine generally comprises a rotary drum mechanism which extracts successive signatures from the bottom of a stack of signatures in a stack hopper and delivers or deposits them upon a continuously advancing conveyor. As the conveyor travels along the length of the machine, additional signatures are deposited in a similar manner, and groups of signatures are thereby accumulated and delivered for further operation, such as stapling or binding into books.

In the art of signature gathering machines, one of the central operations is the separating and positioning of the lowermost signature in the stack of signatures for extraction therefrom. In known signature gathering machines, the separator mechanisms used to perform this operation are generally of two types: a rotary separator mechanism as illustrated by the Kleinberg U.S. Pat. No. 2,020,321; and a reciprocating separator mechanism as illustrated by the Kleinberg U.S. Pat. No. 2,621,039.

Although generally satisfactory, separator mechanisms of known signature gathering machines may experience difficulties under certain operating conditions. In particular, rotary separator mechanisms generally lack continual support for the forward edges of the signature in the stack thereby increasing the possibility of the next lowermost signature trailing or following the lowermost signature being extracted from the stack. In addition, the pressure exerted upon these separator mechanisms by the signatures in the stack is generally dependent upon the number of signatures in the stack thereby increasing the possibility of marking or smearing the signature on the bottom of the stack when the hopper is relatively full of signatures. Also, the direction of rotation of these separators cannot thermally be reversed resulting in decreased versatility of the gathering machine. Further, besides experiencing similar difficulties, reciprocating separator mechanisms require a dual motion which can be inefficient at high operating speeds and can cause excessive wear and increased operating noise.

SUMMARY OF THE INVENTION

The present invention, according to one preferred embodiment, provides a signature gathering machine which avoids or obviates problems of the type noted above.

Thus, the signature gathering machine constructed in accordance of one preferred embodiment of the invention embodies several generic features of conventional signature gathering machines of the type wherein signatures are stacked one upon another in a stack hopper. The signatures in the stack have forward edges exposed along a side of the hopper wherefrom the forward edges of successive lowermost signatures in the stack are detached downwardly from the stack by a suction detacher means and separated and extracted therefrom by a rotary drum mechanism. The rotary drum carries or transfers the successive signatures for release or discharge upon a continuously advancing conveyor. The conveyor travels along the length of the machine and accumulates groups of signatures and delivers them for further operations such as stapling or binding into books.

While the present invention embodies the generic feature of signature gathering machines as outlined above, it constitutes an improvement over known gatherers in that it incorporates an improved rotary lifter separator. The rotary lifter separator, according to one preferred embodiment, comprises a disklike rotary separator having a leading edge which rotates and enters between the detached lowermost signature and the stack and, by operating with a camming or wedging action, depresses and further positions the lowermost signature for extraction from the stack. The periphery of the upper surface of the disklike rotary separator continually provides a support for the exposed edges of the signatures in the stack above, thereby reducing pressure and friction on the next lowermost signature and preventing it from falling and following the lowermost signature being extracted. A stack support means having a finger which extends into the stack of signatures above the detached lowermost signature provides support to the exposed edges of a portion of signatures in the stack above, thereby further reducing pressure and friction and facilitating the extraction of the lowermost signature. A controlling means cyclically reciprocates the finger of the stack support into and out of the stack thereby cyclically releasing the support to the signatures and permitting the signatures to settle towards the bottom of the stack.

The rotary lifter separator provides a means for efficiently separating and precisely positioning the lowermost signature for extraction from the stack. The periphery of the upper surface of the disklike rotary separator provides continual support for the exposed edges of the signatures in the stack above thus preventing the next lowermost signature from falling and following the lowermost signature as it is being extracted. The stack support provides support for the exposed edges of the portion of signatures in the stack thereby reducing the pressure and friction against the lowermost signature and the possibility of signature marking or ink smearing. Further, the disklike rotary separator is symmetrical about an axis of the disk lying in the plane of the disk and the direction of rotation of the rotary separator is reversible thereby increasing its versatility by enabling separation of signatures at their folded edge regardless of whether the signatures are bound at their folded edges or at their open edges.

Accordingly, it is an object of the invention to provide a signature gathering machine having a rotary separator mechanism which will be smooth and quiet while operating, and will be more efficient in separating and positioning successive lowermost signatures of the stack for extraction therefrom.

A further object of the invention is to provide a rotary separator mechanism which continually supports the exposed edges of the signatures in the stack.

A still further object is to provide a stack support to further support the exposed edges of a portion of the signatures in the stack.

A still further object is to provide a rotary separator mechanism which will efficiently separate lowermost signatures when rotated in either direction.

These and other objects, advantages and features of the invention will become more apparent from the following description taken in conjunction with the accompanying drawings.

DESCRIPTION OF THE PREFERRED EMBODIMENT

Figure 1:
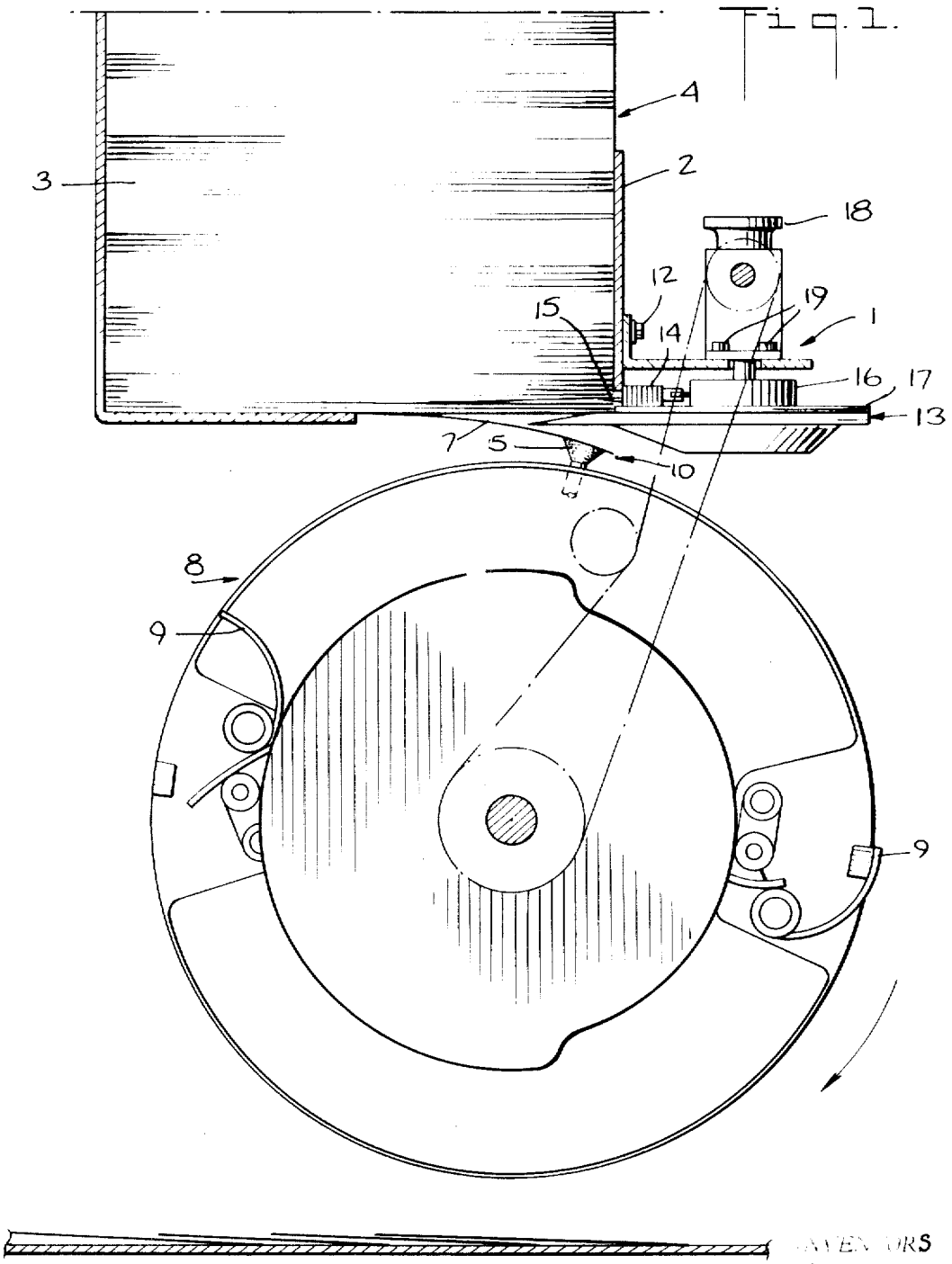
FIG. 1 is a side elevation view of one preferred embodiment of the rotary lifter separator shown in operable relationship to a stack of signatures and a rotary drum mechanism.
Figure 2:
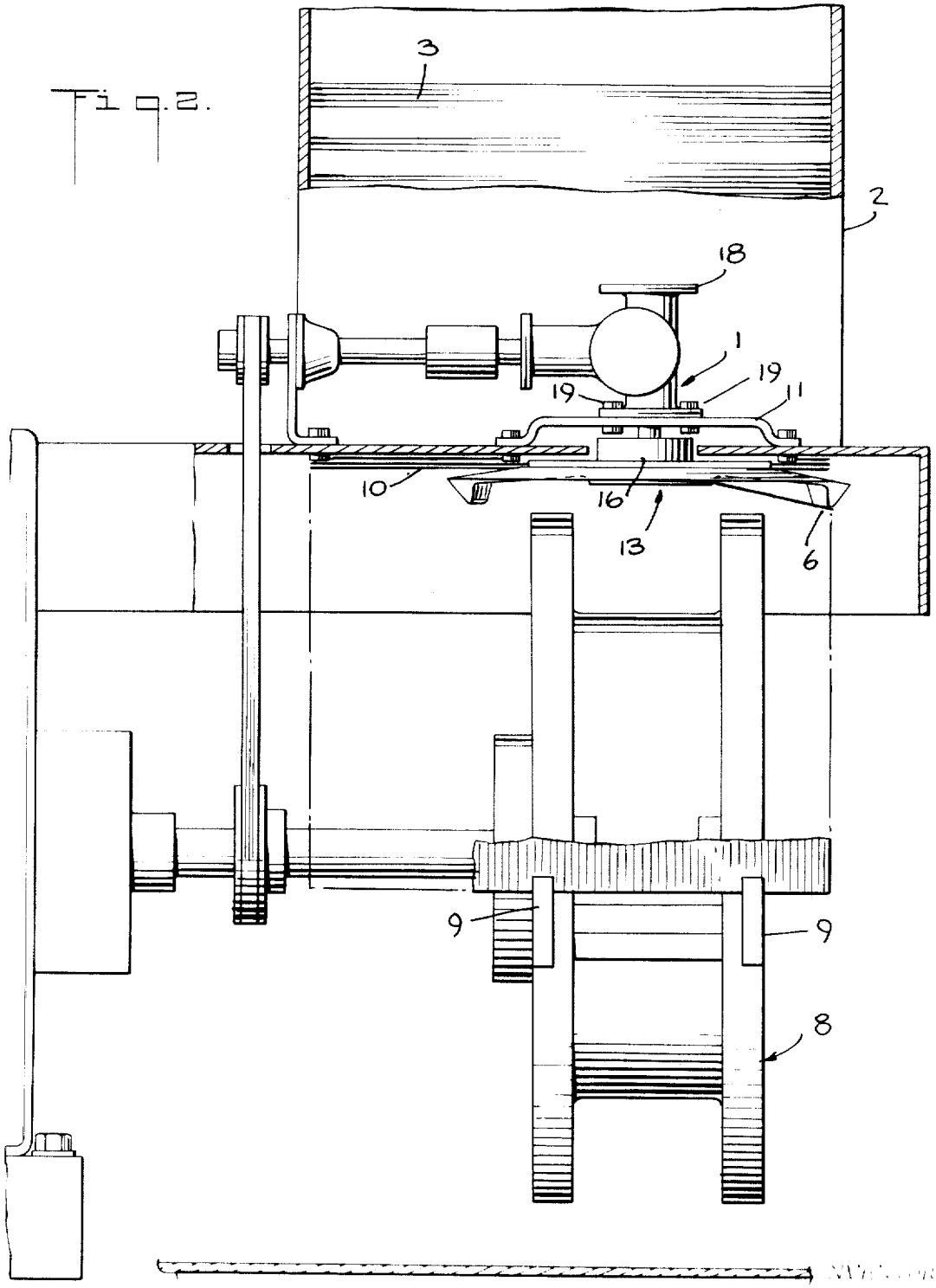
FIG. 2 is a front elevation view of the rotary lifter separator shown in FIG. 1.

With reference to the drawings, one preferred embodiment of the rotary lifter separator is shown in FIGS. 1 and 2. The rotary lifter separator 1 is shown operably connected to a portion of a single station or hopper of a known signature gathering machine, for example, see Kleinberg U.S. Pat. No. 2,621,039, comprising, in addition to heavy frame parts and base, a power and drive means and other general parts, the following operating mechanisms; an elevated stack hopper 2 supporting a vertical stack of signatures 3 having the forward edges 4 of the signatures forming an exposed side of the stack; a suction detacher means 5 mounted to swing bodily inward below the hopper 2 and out again to clear the stack, and will inward to engage and deflect the forward corner 6 of the lowermost signature 7 downwardly from the stack; a rotary drum mechanism 8 beneath the hopper 2, continuously rotated, and carrying grippers 9 to grip the detached and depressed exposed forward edge 10 of the lowermost signature 7 thereby pulling the signature from the stack in an extracting direction, the drum carrying or transferring the signature downwardly and around the periphery of the drum for release and discharge advancingly beneath the drum; and a continuously advancing conveyor (not shown) longitudinally traveling with continuous advance beneath the rotary drum mechanism 8 upon which successive signatures are deposited and, as the conveyor advances past other hoppers, additional signatures are accumulated and delivered for further operations.

The rotary lifter separator 1 is mounted to the front of the elevated stack hopper 2 by means of a mounting bracket 11 and nut and bolt assemblies 12. The rotary lifter separator 1 comprises a disklike rotary separator 13 which rotates into the stack of signatures 3 and separates and depresses the lowermost signature 7 downwardly away from the stack while continually supporting the forward edges 4 of the signatures in the stack 3. A stack support means, shown as a cam actuated, reciprocatively mounted finger 14, is connected to and supported by the mounting bracket 11 and positioned between the central axis of the rotary separator and the exposed edges of the signatures so that when the finger 15 is fully extended into the signature stack 3 it provides support for a portion of the signatures in the stack. A means for controlling the stack support means, shown as a cam 16 rotatably mounted to tie upper surface 17 of the rotary separator 13, is operably coupled to the stack support means. A drive means 18 is attached to the mounting bracket 11 by means of nut and bolt assemblies 19, and is operably coupled to rotate the disklike rotary separator 13 about its central axis in a timed relationship with the rotary drum mechanism 8. The drive means 18 includes a means for reversing the direction of rotation of the disklike rotary separator. Also, an additional suction detacher means (not shown), other than the suction detacher means 5, is mounted to engage and deflect the other forward corner of the lowermost signature 9 when the direction of rotation of the disklike separator is reversed.

Figure 3:
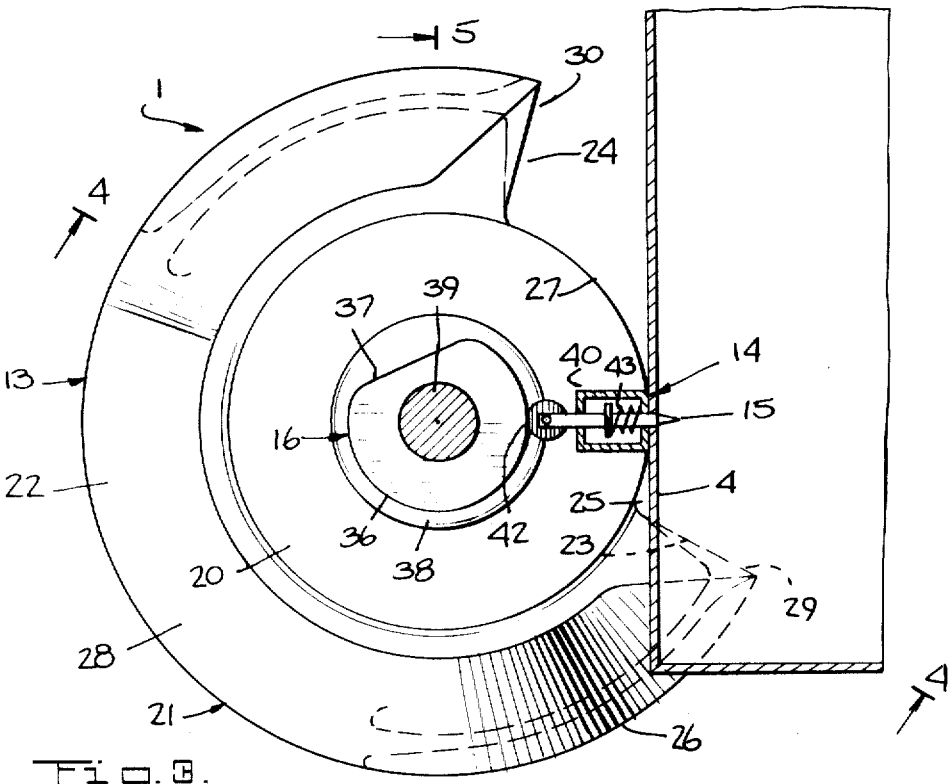
FIG. 3 is a plan view of the rotary lifter separator of FIG. 1 as the leading edge of the disklike rotary separator begins to rotate between a detached lowermost signature and the stack.
Figure 4:
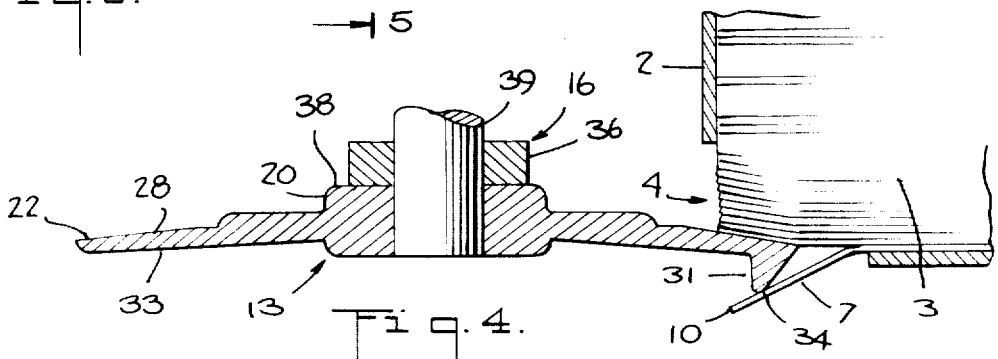
FIG. 4 is a cross-sectional view of the rotary lifter separator shown in FIG. 3.
Figure 5:
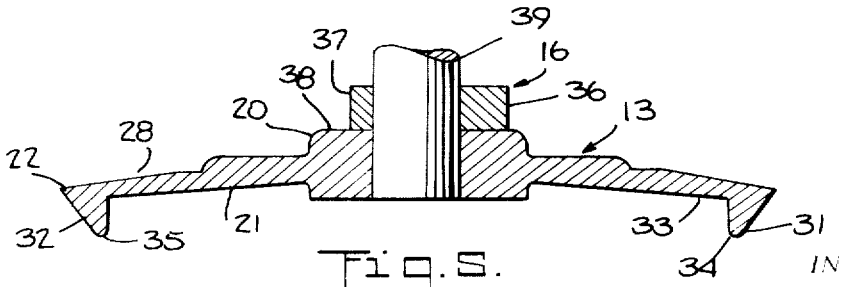
FIG. 5 is a second cross-sectional view of the rotary lifter separator shown in FIG. 3.

Now, referreing to FIGS. 3–5, the rotary lifter separator 1 is shown in greater detail. The disklike rotary separator 13 comprises a hub 20 forming the central portion of the disk 21 and an annular rim 22. The annular rim 22 extends around approximately three-quarters of the periphery of the hub 20 and terminates at a leading edge 23 and a trailing edge 24 forming an opening 25 extending around approximately one-quarter of the hub 20. The opening 25 in the outer portion of the disk 21 extends inwardly from the perimeter 26 of the disk to the perimeter 27 of the hub. As the disk 21 rotates into the stack, the upper surface 28 of the annular rim 22 continually supports the signatures in the stack 3. The upper surface 28 is smooth to prevent marking or tearing of the signatures and is beveled downwardly and outwardly in a radially extending direction from the central axis of the disk to a slight angle with respect to the plane of the disk. The leading and trailing edges 23 and 24 are substantially straight and extend radially from the center of the hub. The leading edge designates the edge which, depending upon the direction of rotation of the disk, initially enters the stack between the detached lowermost signature and the stack of signatures. The leading and trailing edges 23 and 24 have wedge-shaped surfaces 29 and 30 extending into the opening 25 to enable the leading edge 23 to smoothly and efficiently rotate and enter between the detached lowermost signature and the stack of signatures when the disklike rotary separator 13 is rotated into the stack.

Two similar ribs 31 and 32 extend along portions of the lower surface 33 of the annular rim 22. The ribs 31 and 32 are wedge-shaped and begin, respectively, at the leading and trailing edges 23 and 24 and extend away from the opening 25 and around approximately one-quarter of the periphery of the annular rim 22 in opposite directions. The points 34 and 35 of the wedge-shaped ribs 31 and 32 are slightly blunted. The extent of each rib beneath the annular rim 22 is maximum over a portion of the rib nearest the opening 25 and thereafter decreases along the length of the rib. The portion of each rib nearest the opening 25 is beveled to form a smooth extension of the lower surface of the wedge-shaped leading or trailing edges 23 and 24 to enable the rib 31 to apply a smooth camming action on the detached lowermost signature 7 as the leading edge 23 enters and rotates into the stack to separate and position it for extraction from the stack.

The cam 16 is a short right annular cylinder with the outer surface 36 of the cylinder interrupted by a substantially flat segment 37 along the length of the cylinder. The cam 16 is attached to the upper surface 38 of the hub 20 with the central axis of the cam extending along the central axis of the disk 21.

The disklike rotary separator 13 and the cam 16 are pivotally mounted by the shaft 39 of the drive means 18 to rotate about the central axis of the disk 21 and in a plane substantially parallel and adjacent to the plane of the lowermost signature 7 in the stack. The central axis of the disk 21 is positioned sufficiently adjacent to the exposed forward edges 4 of the signature in the stack 3 for the periphery of the upper surface 28 of the annular rim 22 to maintain a supporting relationship to the forward edges 4 of the signatures in the stack 3 when the opening 25 faces towards the exposed forward edges 4. Therefore, the upper surface 28 provides continual support to the forward edges 4 of the signatures as the disklike rotary separator 13 rotates.

The stack support means 14 comprises a housing 40 and a long cylindrical operating rod 41. The rod 41 is reciprocatively mounted in the housing 40 for longitudinal movement between the central axis of the disk 21 and the exposed forward edges 4 of the signatures in the stack 3 with the ends of the rod 41 extending in opposite directions outside the housing 40. A cam following means, for example, a roller 42, is attached to one end of the rod and the other end has a finger 15 extending towards the stack 3. The roller 42 rides along the outer surfaces 36 of the cam 16 and is operably coupled to follow the surface and be reciprocated thereby by means of a spring 43 surrounding the rod 41 with one end resting against a seat 44 attached near the midpoint of the rod and the other end resting against the housing 40. When the roller 42 rides along the circular outer surface 36 of the cam 16 the finger 15 fully extends into the signature stack 3 slightly above the upper surface 28 of the annular rim 22 and supports the portion of the signatures in the stack above the finger. When the roller 42 rides along the flat segment 37, the finger 15 retracts from the stack permitting the portion signatures above to settle into the stack hopper, thereby momentarily transferring the support of the stack to the disklike rotary separator.

The size and relative geometric proportions of the rotary lifter separator required for any given signature gathering operation would be obvious to one skilled in the art when the general description given above is read in connection with the following description of one operating cycle of the rotary lifter separator.

Figure 6:
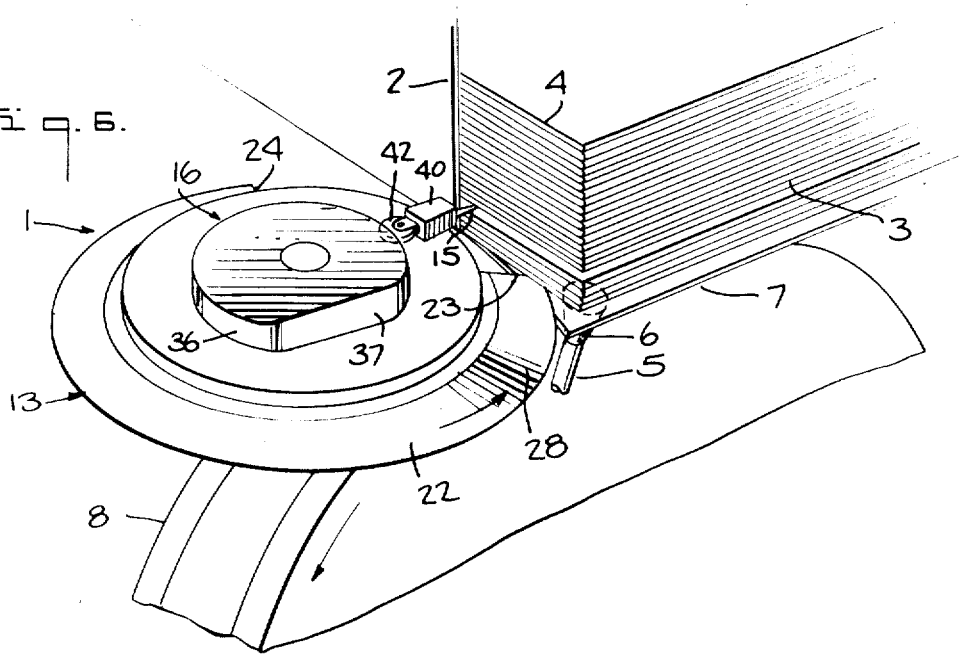
FIG. 6 is a perspective view of the rotary lifter separator of FIG. 1 shown as the leading edge of the disklike rotary separator begins to rotate between a detached lowermost signature and the stack.
Figure 7:
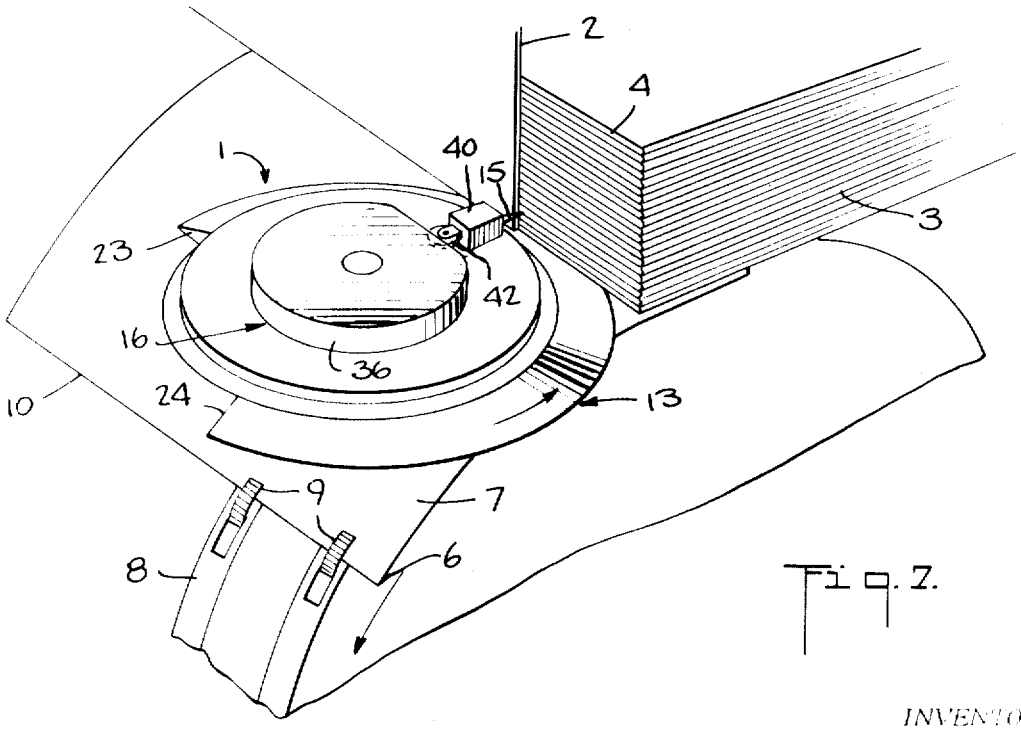
FIG. 7 is a perspective view of the rotary lifter separator or FIG. 1 shown after it has completed separating the detached lowermost signature in the stack, and as the signature is being extracted therefrom.

Accordingly, referring to FIGS. 6 and 7, the rotary lifter separator 1 is shown at two relative positions during the extraction of a single signature from the bottom of the signature stack. In FIG. 6, the suction detacher means 5 is shown after it has completed deflecting the forward corner 6 of the lowermost signature 7 downwardly from the stack 3. The wedge-shaped leading edge 23 of the dislike rotary separator 13 is beginning counterclockwise rotation into the signature stack between the detached lowermost signature 7 and the stack. As the leading edge 23 enters the stack, the upper surface 28 of the annular rim 22 ahead of the trailing edge 24 supports the forward edges 4 of the signatures in the stack. The roller 42 of the stack support means 14 is riding along the circular outer surface 36 of the cam 16, and the Finger 15 is fully extended into the stack providing further support for the portion of signatures in the stack above.

As the leading edge 23 rotates further into the stack, it engages and lifts the signatures in the stack ino the supporting relationship with the upper surface 28 of the annular rim 22 behind the leading edge 23 and, with a smooth camming action, depresses the lower most signature 7 into contact with the blunted point 34 of the wedge-shaped rib 31. When the upper surface 28 fully supports the forward edges 4 of the signatures, the trailing edge 24 leaves the stack and the upper surface 28 of the annular rim 22 ahead of the trailing edge 24 ceases to support the signatures.

The disklike rotary separator 13 continues to rotate counterclockwise into the stack. The forward edges 4 of the lowermost signatures in the stack slide up the beveled upper surface 28 of the annular rim 22 and is further lifted and supported thereby substantially reducing the friction as the lowermost signature is extracted from the stack. In addition, the wedgeshaped rib 31 further separates and depresses the lowermost signature 7 to the position from which one set of grippers 9 on the rotary drum mechanism 8 grips the forward edge 10 of the lowermost signature 7 and pulls the signature in an extracting direction from the stack.

In FIG. 7 the rotary lifter separator 1 is shown as the lowermost signature 7 is being pulled from the stack by the rotary drum mechanism 8. The disklike rotary separator 13 has rotated to a position where the roller 40 of the stack support means 14 begins to ride along the flat segment 37 of the outer surface 36 of the cam 16 causing the finger 15 to retract from the stack, whereby the signatures settle into the hopper and are briefly fully supported by the upper surface 28 of the annular rim 22. As the disklike rotary separator 13 further rotates counterclockwise, the roller 40 again rides up onto the curved outer surface 36 of the cam 16, thereby causing the finger 41 to be inserted back into the stack, and the finger again supports the portion signatures in the stack 3 above during the remainder of the operating cycle.

As described above, the disklike rotary separator is symmetrical about the axis of the disk lying in the plane of the disk and bisecting the opening in the annular rim. This symmetry enables the rotary lifter separator to smoothly and efficiently separate lowermost signatures from the stack when the direction of rotation of the disklike rotary separator is reversed. Therefore, the preferred embodiment of the signature gathering machine described above can separate signatures regardless of whether the signatures are stacked in the hopper with their folded edges exposed at the front of the stack hopper, or with their folded edges on either the left side or the right side of the hopper when viewed from the front of the hopper.

Although the preferred embodiment of the rotary lifter separator is described above as cooperating with two suction detacher means, one mounted below each of the forward corners of the lowermost signature in the stack, which selectively detach one or the other forward corners depending upon the direction of rotation of the disklike rotary separator, it will be apparent to those skilled in the art that a single suction detacher means mounted to engage and deflect the midpoint of the forward edge of the lowermost signature downwardly from the stack is substitutable for the two suction detacher means under most operating conditions. When the rotary lifter separator is mounted with the central axis of the disk lying in a plane passing through the midpoints of the forward edges of the signatures and bisecting the signatures in the stack, the single suction detacher means will cooperate with the rotary lifter separator to efficiently and smoothly separate and position the lowermost signature in the stack for extraction therefrom regardless of the direction of rotation of the disklike rotary separator.

Additionally, it will be obvious to those skilled in the art that the rotary lifter separator above will smoothly and efficiently separate and position signatures from a slanted stack hopper or a horizontal stack hopper for extraction therefrom. In a horizontal stack hopper, the signatures are placed adjacent one another in the hopper, and they are held or forced together, typically, by some force other than gravity, for example, a compressed spring at one end of the hopper. In the slanted stack hopper and the vertical stack hopper, the signatures are not only adjacent one another but are also stacked one upon another in the stack hopper. When the rotary lifter separator cooperates to extract signatures from one of these three types of stack hoppers, the endmost signature, referred to as the lowermost signature in the vertical stack hopper described above, is detached and separated from the stack. Since the disklike rotary separator is symmetrical and the direction of rotation can be selectively reversed, the rotary lifter separator can separate the endmost signature from either of these stack hoppers regardless of whether the signatures are placed adjacent one another in the hopper with their folded edges exposed at the side of the hopper nearest the rotary separator or with their folded edges at one of the other two opposing sides of the hopper, corresponding to the left and right sides of the vertical stack hopper above.

When the rotary liter separator cooperates to successively separate and position lowermost signatures for extraction from a vertical stack hopper the disklike rotary separator has an upper surface and a lower surface. The upper surface faces in the direction of the end of the stack away from the lowermost signature and the lower surface faces in the opposite direction. Of course, when the rotary lifter separator cooperates to separate endmost signatures from a slanted stack hopper or horizontal stack hopper, the orientation of two surface in space will change and the upper surface of the disklike rotary separator will face in the direction of the end of the stack opposite the endmost signature and the lowermost surface will face in the opposite direction.

Other modifications and variations will be apparent to those skilled in the art, and therefore, may be made without departing from the spirit and scope of the present invention.

What is claimed is:

1. A signature gathering machine of the type wherein signatures are stacked adjacent one another in a stack hopper, the edges of the signatures forming an exposed side of the stack which is disposed in a plane extending along a side of the hopper wherefrom successive endmost signatures are detached from the stack by suction detacher means and further separated and positioned for extraction therefrom by a rotary drum mechanism, the extracted signatures being carried and transferred thereby to a continuously advancing conveyor adapted to receive and accumulate further signatures from other signature stacks, wherein the improvement comprises:

a. A rotatable disk having an annular rim, the annular rim extending about a portion of the periphery of the disk and terminating at leading and trailing edges, as determined by the direction of the rotation of the disk, to form a radial opening in the outer portion of the disk, the leading edge of the annular rim being wedge-shaped to enable it to smoothly and efficiently enter the exposed side of the stack of signatures between the detached endmost signature and the stack when the disk is rotated into the side of the stack, the upper surface of the annular rim being smooth to enable it to support the forward edges of the signatures in the stack without maring or tearing the endmost signature as the disk rotates, the opening in the annular rim between the leading and trailing edges being sufficiently wide to permit the endmost signature to be detached by the suction detacher means while the portion of the upper surface of the annular rim near the trailing edge supports the portion of the signatures in the stack adjacent the exposed side and before the leading edge enters the exposed side of the stack, the lower surface having a rib extending along a portion of the periphery of the annular rim, the rib beginning at the leading edge and extending away from the opening, the portion of the rib nearest the leading edge being shaped to apply a smooth camming action on the depressed endmost signature to further separate the detached endmost signature as the leading edge rotates into the stack;

b. a means for pivotally mounting the disk to rotate about the central axis of the disk and in a plane substantially parallel and adjacent to the plane of the endmost signature in the stack, the mounting means positioning the central axis of the disk sufficiently adjacent to the exposed side of the stack of signatures for the periphery of the upper surface of the annular rim to maintain the supporting relationship to the portion of the signatures in the stack adjacent the exposed side when the opening in the disk faces toward the exposed side thereby permitting the upper surface of the annular rim to continually support the portion of the signatures in the stack adjacent the exposed side as the disk rotates; and c. a drive means to rotate the disk.

2. The apparatus of claim 1 further defined wherein the trailing edge of the annular rim is wedge-shaped, the lower surface of the annular rim having an additional rib, similar to the rib and beginning at the trailing edge and extending away from the opening adjacent the periphery of the annular rim in a direction opposite to which the rib extends, the additional rib enabling the disk to separate the endmost signatures of the stack of signatures when the direction of the rotation of the disk is reversed by said drive means.

3. The apparatus of claim 2 further comprising a means to reverse the direction which the drive means rotates the disk.

4. The apparatus of claim 1 further defined wherein:

a. the annular rim extends around approximately three-quarters of the periphery of the disk;

b. the leading and trailing edges of the opening being substantially straight and extending radially from the center of the disk;

c. the upper surface of the annular rim being beveled downwardly and outwardly in a radially extending direction from the central axis of the disk to a slight angle with respect to the plane of the disk; and d. the rib extending around approximately one-quarter of the periphery of the annular surface, the portion of the rib nearest the leading edge being shaped to apply a smooth camming action on the depressed endmost signature, the downward extent of the rib beneath the annular rim being maximum for the portion of the rib nearest the leading edge of the annular rim and thereafter decreasing along the along the length of the rib.

5. The apparatus of claim 4 further defined wherein the trailing edge of the annular rim is wedge-shaped, the lower surface of the annular rim having an additional rib, similar to the rib and beginning at the trailing edge and extending away from the opening adjacent the periphery of the annular rim in a direction opposite to which the rib extends, the additional rib enabling the disk to separate the endmost signatures of the stack of signatures when the direction of the rotation of the disk is reversed by said drive means.

6. The apparatus of claim 5 further comprising a means to reverse the direction which the drive means rotates the disk.

7. The apparatus of claim 1 further comprising:

a. a means for supporting at least a portion of the signatures in the stack to reduce the pressure exerted on the end most signatures and the upper surface of the annular rim of the disk by the portion of the signatures, and b. a means for controlling the stack support means to cyclically release the support to the portion of the signatures, thereby permitting the signatures to settle towards the end of the stack hopper.

8. The apparatus of claim 7 further defined wherein the controlling means comprises:

a. a generally cylindrical cam, the outer surface of the cylinder being interrupted by a subtsantially flat segment, the cam being disposed adjacent to the upper surface of the disk with the central axis of the cam extending along the central axis of the disk, the cam being connected to said drive means to be rotated with the disk;

b. a cam follower connected to the stack support means; and c. a means for biasing the cam follower to engage the surface of the cam and be reciprocated thereby, the reciprocating cam follower causing the stack support means to support the portion of the signatures in the stack when the cam follower follows the curved surface of the cam and causing the stack support means to release the support of the stack when the cam follower follows the flat segment of the cam.

9. The apparatus of claim 7 further defined wherein the stack support means comprises:

a. a finger adapted to extend into the exposed side of the stack of signatures;

b. an operating rod connected to the finger being reciprocatively mounted for movement between the central axis of the disk and the exposed side of the stack of signature;

c. a means for operably connecting the operating rod to the controlling means to be reciprocated thereby, the reciprocating operating rod causing the finger to support the portion of the signatures in the stack when the finger is extended into the stack and causing the finger to release the support of the stack when the finger is retracted out of the stack.

10. In a separator for folded signatures wherein the bottom signature of a stack of horizontally lying signatures is initially separated at a corner adjacent the fold therein, and wherein the separator is adapted to separate signatures from either of two corner edges which define a feeding side of said stack, relatively flat rotary disk means substantially coplanar with the bottom of the stack and rotatable on an axis generally parallel with the corner edges of said stack, said disk means having a circular periphery and an interrupted portion therein, the extent of the interrupted portion and the position of said disk means relative to the feeding side of said stack being such that at all times at least a portion of the circular periphery is within the feeding side of said signature stack so as to provide support for said stack along said side, a hopper aligning the sides of said stack and supporting the principal area of the bottom of said stack except in the area of entrance of the disk means into said feeding side, said hopper having the side and corners thereof adjacent the disk means near the bottom of the stack open for entrance thereinto of said disk means in either one of two different rotational directions depending on the location of the folds in the signatures of said stack, transporting means below the stack for receiving signatures separated by said disk means and carrying them away from said stack, grasping means acting on the bottom signature of the stack, said grasping means being operable to reach from below through the interrupted portion of the disk means to pull the folded corner of each signature downwardly in turn, whereby further rotation of said disk means causes its circular periphery to enter the space between the grasped signature and the next adjacent signature, means for operating said grasping means in timed relation with disk rotation to separate one signature from the stack at each disk revolution, disk drive means including means for reversing the direction of rotation of said disk means whereby the circular periphery of the disk means may enter from either of said corner edges.

11. A method for successively separating endmost signatures from signatures stacked adjacent one another in a stack hopper of a signature gathering machine with the folded edges of the signature exposed along one of the two opposing sides of the hopper, which comprises:

a. detaching an exposed folded edge of the endmost signature in the hopper away from the bottom of the stack;

b. further separating and depressing the exposed edge of the endmost signature with a rotating camming action acting between the endmost signature and the stack and commencing at the folded edge and proceeding through a substantial portion of the stack of signatures in a plane parallel to the signatures to force the exposed edge away from the stack for extraction therefrom while simultaneously supporting the remainder of the stack from the bottom, the direction of rotation of the rotating camming action being selectable, the selection of a direction of rotation being dependent upon which of the two opposing sides of the stack hopper the folded edges of the signatures fall along;

c. pulling the endmost signature in an extracting direction from the end of the stack while continuing to support the remainder of the stack from the bottom of the stack, and d. continuing to support the bottom of the stack while the exposed edge of the next successive signature is detached.

*12. A signature gathering machine of the type wherein signatures are stacked adjacent one another in a hopper, the edges of the signatures forming an exposed side of the stack which is disposed in a plane extending along a side of the hopper wherefrom sucessive endmost signatures are partially separated from the stack by suction detacher means and further separated therefrom by a rotary gripper drum mechanism, the extracted signatures being carried and transferred by said gripper drum mechanism to a continuously advancing conveyor adapted to receive and accumulate further signatures from other signature stacks, and wherein the improvement comprises:*

*a. a rotatable disk having an annular rim, said annular rim having an outer portion which is generally frusto-conical in shape and extending radially downwardly and outwardly, said annular rim extending about a portion of the periphery of the disk and terminating at leading and trailing edges, as determined by the direction of the rotation of the disk, to form a radial opening in said annular rim, the leading edge of the annular rim being wedge-shaped to enable it to smoothly and efficiently enter the exposed side of the stack of signatures between the partially seprated endmost signature and the stack when the disk is rotated into the side of the stack, the upper surface of the annular rim being smooth to enable it to support the forward edges of the signatures in the stack without marking or smearing the endmost signature as the disk rotates, the opening in the annular rim between the leading and trailing edges being sufficiently wide to permit the endmost signatures to be partially separated by movement of the suction detacher means through said radial opening while the*

*portion of the upper surface of the annular rim near the trailing edge supports the portion of the signatures in the stack adjacent the exposed side;*

*b. a means for mounting the disk to rotate about the central axis of the disk in a plane substantially parallel and adjacent to the plane of the endmost signature in the stack, the mounting means positioning the central axis of the disk sufficiently adjacent to the exposed side of the stack of signatures for the periphery of the upper surface of the annular rim to maintain the supporting relationship to the portion of the signatures in the stack adjacent the exposed side when the opening in the disk faces toward the exposed side thereby permitting the upper surface of the annular rim to continually support the portion of the signatures in the stack adjacent the exposed side as the disk rotates; and*

*c. a drive means to rotate the disk.*

*13. Apparatus as defined in claim 12 wherein the rim has an upper surface which includes a generally horizontally extending flat surface portion and a frusto-conical surface portion which extends radially downwardly and outwardly of said flat surface portion, said radial opening extending through both said flat surface portion and said frusto-conical surface portion, and both said flat and frusto-conical surface portions underlying a portion of the signatures in the stack during rotation of said disk.*

*14. The apparatus of claim 13 further including a finger adapted to extend into the exposed side of the stack of signatures, an operating rod connected to the finger and being mounted for movement between the central axis of the disk and the exposed side of the stack of signatures;*

*and cam means rotatable about the axis of said disk and operably connected to the operating rod to effect reciprocation thereof, the reciprocating operating rod causing the finger to support the portion of the signatures in the stack when the finger is extended into the stack and causing the finger to release the support of the stack when the finger is retracted out of the stack.*

*15. Apparatus as defined in claim 12 wherein said lower surface of said rim has a rib extending along the periphery of the annular rim, the rib beginning at the leading edge and extending away from the opening, the portion of the rib nearest the leading edge being shaped to apply a smooth camming action on the depressed endmost signature to further separate the detached endmost signature as the leading edge rotates into the stack.*

References Cited

The following references, cited by the Examiner, are of record in the patented file of this patent or the original patent.

UNITED STATES PATENTS

| | | | |
|---|---|---|---|
| 1,709,857 | 4/1929 | Kleineberg | 271—101 |
| 2,020,321 | 11/1935 | Kleineberg | 270—56 |
| 3,045,867 | 7/1962 | Flynn | 271—101 X |

EVAN C. BLUNK, Primary Examiner

B. H. STONER, Jr., Assistant Examiner

U.S. Cl. X.R.

271—113